US008570589B2

(12) United States Patent
Togami

(10) Patent No.: US 8,570,589 B2
(45) Date of Patent: Oct. 29, 2013

(54) IMAGE FORMING APPARATUS, IMAGE FORMING METHOD, AND COMPUTER PROGRAM PRODUCT FOR PROCESSING AN IMAGE BASED ON THE TYPE AND CHARACTERISTICS OF THE RECORDING MEDIUM

(75) Inventor: Atsushi Togami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 964 days.

(21) Appl. No.: 12/382,330

(22) Filed: Mar. 13, 2009

(65) Prior Publication Data

US 2009/0232528 A1 Sep. 17, 2009

(30) Foreign Application Priority Data

Mar. 17, 2008 (JP) ................................. 2008-067483

(51) Int. Cl.

| | |
|---|---|
| ***G06K 1/00*** | (2006.01) |
| *G03G 15/00* | (2006.01) |
| *B41J 2/205* | (2006.01) |

(52) U.S. Cl.

USPC ............ 358/1.9; 358/2.1; 358/1.15; 358/504; 399/45; 399/47; 399/48; 347/15; 347/19

(58) Field of Classification Search

None

See application file for complete search history.

(56) References Cited

U.S. PATENT DOCUMENTS

| | | | | |
|---|---|---|---|---|
| 7,038,812 | B2 * | 5/2006 | Hashimoto et al. | 358/1.9 |
| 7,062,183 | B2 * | 6/2006 | Maeyama et al. | 399/45 |
| 7,782,486 | B2 | 8/2010 | Nakano et al. | |
| 2004/0179237 | A1 * | 9/2004 | Takenaka et al. | 358/2.1 |
| 2007/0171245 | A1 * | 7/2007 | Ueda et al. | 347/14 |

FOREIGN PATENT DOCUMENTS

| | | |
|---|---|---|
| JP | 2002-086805 | 3/2002 |
| JP | 2003-44772 | 2/2003 |
| JP | 2005-352029 | 12/2005 |
| JP | 2006-321109 | 11/2006 |
| JP | 2007-118238 | 5/2007 |

OTHER PUBLICATIONS

Office Action dated Sep. 20, 2011 issued in corresponding Japanese Application No. 2008-067483.

* cited by examiner

*Primary Examiner* — Steven Kau

(74) *Attorney, Agent, or Firm* — Harness, Dickey & Pierce, P.L.C.

(57) ABSTRACT

An image forming apparatus includes a sheet-type determining unit that determines a sheet type of a recording sheet; a sheet-characteristic measuring unit that measures a sheet characteristic of the recording sheet; an image processing unit that performs an image processing on image data of an image for adjusting a consumption amount of color material that is used for forming the image on the recording sheet based on the sheet type and the sheet characteristic; and an image forming unit that forms the image of the image data processed by the image processing unit on the recording sheet.

11 Claims, 10 Drawing Sheets

| PAPER TYPE | PAPER CHARACTERISTICS | | | SAVE RATE [%] |
|---|---|---|---|---|
| | GLOSS LEVEL [%] | WHITENESS LEVEL [%] | TRANSMITTANCE [%] | |
| GLOSSY PAPER | 100 | 100 | 100 | 0 |
| COATED PAPER | 80 | 90 | 90 | 10 |
| PLAIN PAPER | 50 | 60 | 60 | 40 |

IMAGE FORMING APPARATUS, IMAGE FORMING METHOD, AND COMPUTER PROGRAM PRODUCT FOR PROCESSING AN IMAGE BASED ON THE TYPE AND CHARACTERISTICS OF THE RECORDING MEDIUM

CROSS-REFERENCE TO RELATED APPLICATIONS

The present application claims priority to and incorporates by reference the entire contents of Japanese priority document 2008-067483 filed in Japan on Mar. 17, 2008.

BACKGROUND OF THE INVENTION

1. Field of the Invention

The present invention relates to a technology for processing an image based on type and characteristic of a recording medium.

2. Description of the Related Art

In a typical image forming apparatus, such as a copier, a printer, and a digital multifunction peripheral (MFP), image data that is read from an original by using a reading device, such as a scanner, or for which an output request is issued from an external device is printed out on a printing medium (for example, a sheet of recording paper) by using color material such as ink or toner.

Regarding the above-mentioned operation, various technologies for saving a consumption amount of the color material that is used for image formation have been developed. For example, Japanese Patent Application Laid-open No. 2006-321109 discloses a printer that has an ink save mode in which the consumption amount of ink can be saved depending on a type or a size of a printing medium. Furthermore, Japanese Patent Application Laid-open No. 2005-352029 discloses a technology for specifying a type of a printing medium and switching between a normal mode and a saving mode depending on the type of the printing medium. In the normal mode, the consumption amount of color material is not controlled while printing, while, in the saving mode, the consumption amount of color material is saved while printing.

Even when recording papers are of the same paper type, such as a glossy paper, a coated paper, or a plain paper, characteristics of the recording papers (paper characteristics), such as a gloss level, a whiteness level, and a transmittance, may not be the same among the recording papers depending on a manufacturer or the like. However, in the technology disclosed in Japanese Patent Application Laid-open No. 2006-321109, a uniform process for saving the consumption amount of the color material is performed for each paper type, so that printing cannot be performed appropriately considering the characteristics of each of the recording papers. Therefore, more amount of the color material than that is necessary for corresponding image formation may be consumed. Furthermore, in the technology disclosed in Japanese Patent Application Laid-open No. 2005-352029, color material to be used is selected depending on a color of the printing medium. However, in this technology, the paper characteristics of the printing medium are not considered, and therefore, a color indicated by color information of the color material may not be correctly output on the sheet material depending on the printing medium.

SUMMARY OF THE INVENTION

It is an object of the present invention to at least partially solve the problems in the conventional technology.

According to one aspect of the present invention, there is provided an image forming apparatus including a sheet-type determining unit that determines a sheet type of a recording sheet; a sheet-characteristic measuring unit that measures a sheet characteristic of the recording sheet; an image processing unit that performs an image processing on image data of an image for adjusting a consumption amount of color material that is used for forming the image on the recording sheet based on the sheet type and the sheet characteristic; and an image forming unit that forms the image of the image data processed by the image processing unit on the recording sheet.

Furthermore, according to another aspect of the present invention, there is provided an image forming method including determining a sheet type of a recording sheet; measuring a sheet characteristic of the recording sheet; performing an image processing on image data of an image for adjusting a consumption amount of color material that is used for forming the image on the recording sheet based on the sheet type and the sheet characteristic; and forming the image of the image data processed at the performing on the recording sheet.

Moreover, according to still another aspect of the present invention, there is provided a computer program product including a computer-usable medium having computer-readable program codes embodied in the medium. The program codes when executed cause a computer to execute determining a sheet type of a recording sheet; measuring a sheet characteristic of the recording sheet; performing an image processing on image data of an image for adjusting a consumption amount of color material that is used for forming the image on the recording sheet based on the sheet type and the sheet characteristic; and forming the image of the image data processed at the performing on the recording sheet.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following embodiments, examples are described in which an image forming apparatus of the present invention is applied to a digital multifunction peripheral (MFP) that is a typical MFP having a facsimile (FAX) function, a printer function, and a function of distributing input images (images read from originals or images input by using the printer function or the FAX function). However, the present invention is not limited to the following embodiments and can be applied to a copier, a printer, or the like.

Figures 1, 2:
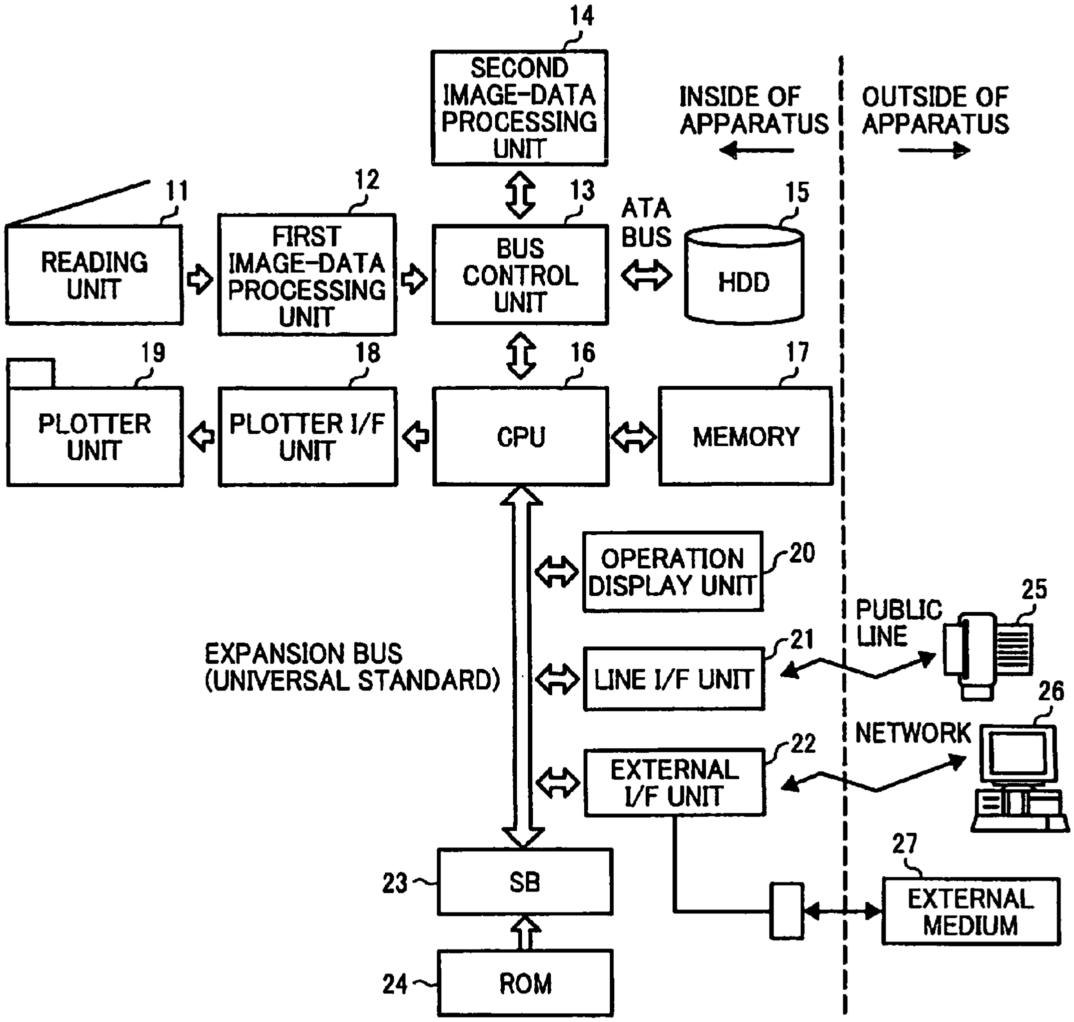
FIG. 1 is a block diagram of a system configuration of a digital color multifunction peripheral (MFP) according to a first embodiment of the present invention.
FIG. 2 is an example of contents of a save-rate setting table stored in a hard disk drive (HDD) of the MFP shown in FIG. 1.

FIG. 1 is a block diagram of a system configuration of a digital color MFP according to a first embodiment of the present invention. The digital color MFP includes a reading unit 11, a first image-data processing unit 12, a bus control unit 13, a second image-data processing unit 14, a hard disk drive (HDD) 15, a central processing unit (CPU) 16, a memory 17, a plotter interface (I/F) unit 18, a plotter unit 19, an operation display unit 20, a line I/F unit 21, an external I/F unit 22, a south bridge (SB) 23, and a read only memory (ROM) 24.

The reading unit 11 includes a line sensor, an analog-to-digital (A/D) converter, and a driving circuit thereof, which are not shown. The line sensor is formed with a photoelectric conversion element such as a charge coupled device (CCD). The reading unit 11 acquires density information of a set original by scanning and generates a digital image data that is 8-bit-based RGB image data (hereinafter, "RGB image data") to be output based on the acquired density information.

The first image-data processing unit 12 performs a process for standardizing a characteristic of the RGB image data output by the reading unit 11 to a predetermined characteristic, and then outputs the processed RGB image data. The characteristic is to be standardized to a characteristic that is suitable for image conversion in an output destination when the image data is stored in the HDD 15 and thereafter re-used.

The bus control unit 13 is a control unit for controlling a data bus that transfers various data such as necessary image data and control commands in the digital color MFP. The bus control unit 13 has a bridge function for bridging a plurality of types of bus standards. In the first embodiment, the bus control unit 13 is connected to the first image-data processing unit 12, the second image-data processing unit 14, and the CPU 16 via a PCI-Express bus, and to the HDD 15 via a storage interface such as an advanced technology attachment (ATA) bus or a serial ATA bus. The bus control unit 13 is implemented as an application-specific integrated circuit (ASIC).

The second image-data processing unit 14 performs image processing suitable for an output destination specified by a user on the RGB image data whose characteristic has been standardized to a predetermined characteristic by the first image-data processing unit 12, and outputs the processed RGB image data.

The HDD 15 is a large-capacity storage unit that can be mounted on a personal computer or the like for storing electronic data. In the digital color MFP, the HDD 15 is mainly used for storing RGB image data and auxiliary information (e.g., setting mode) of the RGB image data. In the first embodiment, a hard disk drive that is connectable via a standardized ATA bus that is an upgraded version of an integrated drive electronics (IDE) is used as the HDD 15.

The HDD 15 stores therein a save-rate setting table in advance. The save-rate setting table contains a paper type indicating a glossy paper, a coated paper, a plain paper, or the like, paper characteristics indicating a standard gloss level, a standard whiteness level, a standard transmittance, or the like for each paper type, and a save rate set for each paper type and corresponding paper characteristics, in an associated manner. The "save rate" indicates a ratio of a reduction amount (an adjustment amount) of color material, such as toner or ink, to a consumption amount of the color material to be used for forming an image on a recording paper having standard paper characteristics (hereinafter, "standard paper") for each paper. A $\gamma$ converting unit 144 adjusts a $\gamma$ characteristic of image data depending on the save rate, so that the consumption amount of color material used for image formation is adjusted. The save rate is a value determined based-on an amount of information related to appearance, such as contrast or color, obtained from an output result on a reference paper, which will be described later, and on a recording paper on which an image is to be formed actually. More particularly, the save rate is determined so that the substantially same amount of information as that of an output result obtained on the reference paper can be output when image formation is performed by using the color material corresponding to the save rate. For example, assuming that the consumption amount of color material with the reference paper is 100 and a save rate of a recording paper with respect to the reference paper is 40%, the consumption amount of the color material is to be reduced by 40 (100×0.4) because of the save rate, and the substantially same amount of information as that to be output on the reference paper can be output on the recording paper by performing image formation using the color material at this save rate.

FIG. 2 is a schematic diagram of an example of the save-rate setting table stored in the HDD 15. The save-rate setting table contains a paper type (a glossy paper, a coated paper, or a plain paper), paper characteristics (a gloss level, a whiteness level, and a transmittance), and a save rate, in an associated manner. In the save-rate setting table, a paper having a paper type of a glossy paper is assumed to be a reference paper that is to be subjected to a normal printing process in which the amount of color material is not adjusted (save rate is 0%). In other words, the substantially same amount of information as that of an output result obtained on a glossy paper through image formation can be output on each recording paper by performing image formation using the color material at the save rate set in the save-rate setting table. It is assumed that, while the save-rate setting table is stored in the HDD 15 in advance, items and setting values in the save-rate setting table stored in the HDD 15 can be changed as appropriate. Although a paper of other paper type can be employed as a reference paper, it is preferable to employ a recording paper on which an image can be output with relatively high quality, such as a glossy paper as employed in the first embodiment, as a reference paper.

The CPU 16 is a microprocessor that controls the entire digital color MFP. In the first embodiment, the CPU 16 is assumed to be an integrated CPU in which an additional function is integrated with a CPU core, which is becoming popular. More particularly, it is assumed that the CPU 16 is integrated with a connect function for enabling a connection to a universal standard I/F and a bus connect function with a crossbar switch.

The memory 17 is a volatile memory for storing data temporarily used for resolving a speed difference caused by bridging a plurality of types of bus standards or a processing speed difference among connected components, and temporarily storing therein computer programs or inter-process data when the CPU 16 controls the digital color MFP. Because the CPU 16 is required to perform high-speed processing, the CPU 16 boots a system by using a boot program stored in the ROM 24 at the time of normal boot, and thereafter, the CPU 16 performs processing by using computer programs loaded on the memory 17 that can be accessed at high speed. In the first embodiment, a standardized dual in-line memory module (DIMM) that is typically used in a personal computer is used as the memory 17.

The plotter I/F unit 18 performs, upon receiving CMYK image data, which will be described later, via a universal standard I/F integrated with the CPU 16, bus bridge processing to output the CMYK image data to a dedicated I/F of the plotter unit 19. In the first embodiment, a PCI-Express bus is used as the universal standard I/F.

Upon receiving the CMYK image data from the plotter I/F unit 18, the plotter unit 19 outputs the received CMYK image data onto a printing paper through an electrophotographic process using a laser beam.

The operation display unit 20 functions as an interface between the digital color MFP and a user, and includes a liquid crystal display (LCD) having a touch panel (not shown) and key switches (not shown) including keys for setting various process modes, a numeric key, a start key, and the like. The operation display unit 20 displays various states of the digital color MFP and an operation method on the LCD, and detects an input received from a user via the touch panel or the key switches. In the first embodiment, the operation display unit 20 is connected to the CPU 16 via a PCI-Express bus.

Examples of the process modes that can be selected by a user include a color/monochrome mode, an application mode, and an image quality mode. More particularly, the color/monochrome mode includes a full-color mode, a single-color mode, and a black-and-white mode. The application mode includes a copier mode, a scanner mode, a FAX mode, and a scanner distribution mode. The image-quality mode includes a character mode, character and photograph mode, and a photograph mode. Furthermore, a setting mode in which colors of an original can be darkened and lightened is included in the process modes.

The line I/F unit 21 is a unit that connects a PCI-Express bus and a telephone line to each other. With the line I/F unit 21, the digital color MFP can exchange various data with a FAX device 25 that functions as an image output device (an image processing unit) via the telephone line.

The external I/F unit 22 is a unit that connects a PCI-Express bus and a personal computer (PC) 26 that is an external device to each other. With the external I/F unit 22, the digital color MFP can exchange various data with the PC 26. In the first embodiment, a network (ETHERNET (registered trademark)) is used as a connection I/F between the external I/F unit 22 and the PC 26. In other words, the digital color MFP is connected to the network via the external I/F unit 22. The PC 26 performs various controls or an input and an output of image data to the digital color MFP via application software or application driver installed in the PC 26.

The SB 23 is a chipset used in a typical PC and is a universal electronic device. The SB 23 is configured as a universal circuit with a bus bride function, which is typically used for configuring a CPU system including a PCI-Express and an industry standard architecture (ISA) bridge. In the first embodiment, the SB 23 has a bridge function to the ROM 24.

The ROM 24 is a memory for storing various computer programs (including a boot program) to be used by the CPU 16 for controlling the digital color MFP. Examples of the computer programs include computer programs for a copy-operation process (copier application), a scanner-distribution process (scanner distribution application), and a FAX-transmission process (FAX application).

A process of outputting image data, which is a salient process performed by the digital color MFP, is described below.

A process from a scanner input of image data of an original by the reading unit 11 to a plotter output of the scanned image data by the plotter unit 19 is described below.

When a user sets an original in the reading unit 11 and makes a setting of a desired mode and the like and an input of a copy start instruction through the operation display unit 20, the operation display unit 20 converts information input by the user into control command data indicating a copy start in the digital color MFP and issues the control command data. The issued control command data indicating the copy start is sent to the CPU 16 via the PCI-Express bus.

The CPU 16 runs a computer program for the copy-operation process (copier application) based on the control command data indicating the copy start, and sequentially performs settings and operation necessary for copy operation. The CPU 16 determines whether a requested operation is to be performed by using the plotter unit 19 based on the control command data. When the requested operation is to be performed by using the plotter unit 19, the CPU 16 sends an instruction for suppressing a consumption amount of color material, such as toner or ink, to be used by the plotter unit 19 (hereinafter, "color-material saving instruction") to the second image-data processing unit 14. Although it is assumed in the first embodiment that the color-material saving instruction is sent when the requested operation is to be performed by using the plotter unit 19, the present invention is not limited to this example and other methods are applicable. For example, it is possible to send the color-material saving instruction depending on contents of a process or the number of papers to be printed. The above-mentioned process is described in detail below.

The reading unit 11 obtains RGB image data by scanning an original and sends the obtained RGB image data to the first image-data processing unit 12. The first image-data processing unit 12 standardizes characteristics of the RGB image data to predetermined characteristics and then sends the standardized RGB image data to the bus control unit 13.

Figure 3:
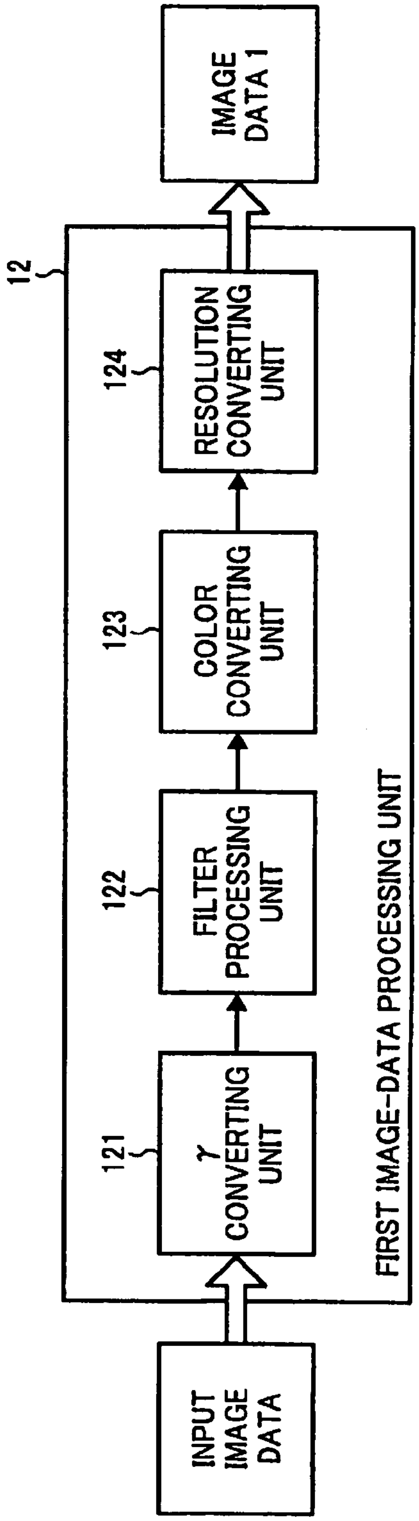
FIG. 3 is a process block diagram of a first image-data processing unit shown in FIG. 1.

The first image-data processing unit 12 is described in detail below with reference to FIG. 3. FIG. 3 is a process block diagram of the first image-data processing unit 12. The first image-data processing unit 12 includes a $\gamma$ converting unit 121, a filter processing unit 122, a color converting unit 123, and a resolution converting unit 124.

Figure 4:
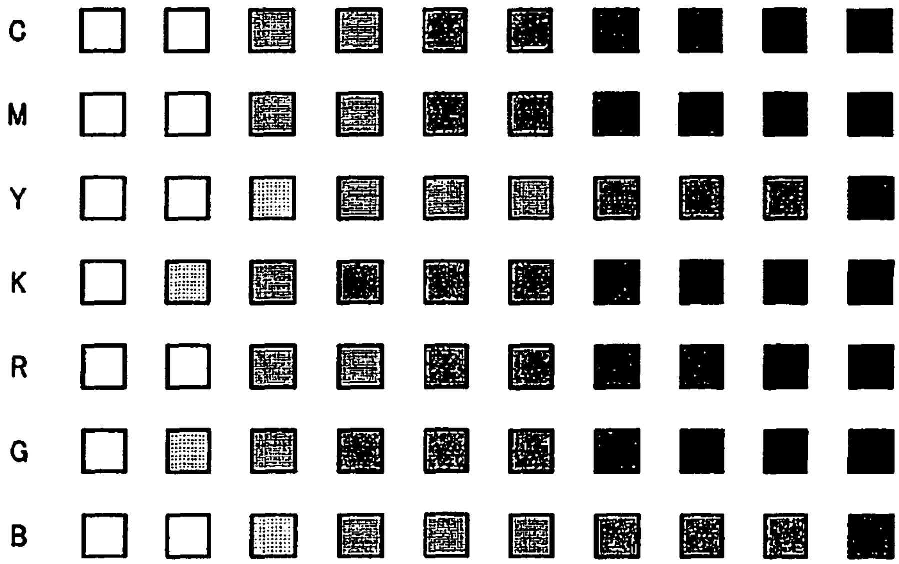
FIG. 4 is an example of a chart used for standardizing a γ characteristic of RGB image data to a predetermined γ characteristic by a γ converting unit shown in FIG. 3.

The $\gamma$ converting unit 121 converts a $\gamma$ characteristic of input image data (the RGB image data) obtained from the reading unit 11 into a predetermined value (e.g., $\gamma$=2.2) that is determined from a characteristic based on a reflectivity through $\gamma$ conversion. In the first embodiment, the $\gamma$ characteristic is converted so that a predetermined $\gamma$ characteristic is obtained when a chart shown in FIG. 4 is scanned.

Figure 5:
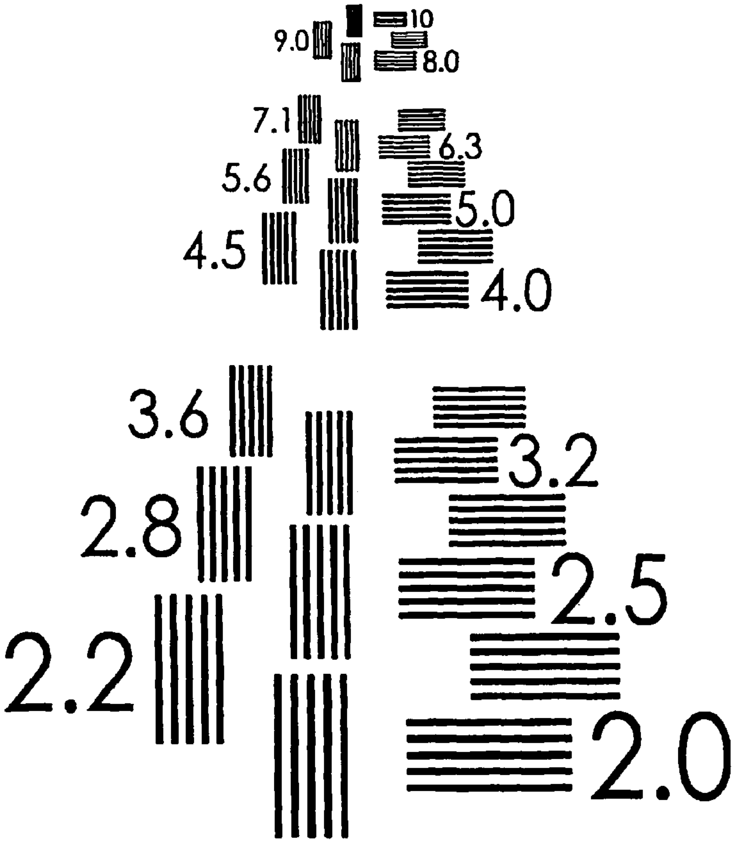
FIG. 5 is an example of a reference chart for standardizing sharpness of RGB image data to a predetermined sharpness by a filter processing unit shown in FIG. 3.

The filter processing unit 122 converts a modulation transfer function (MTF) characteristic indicating sharpness of the RGB image data into a predetermined characteristic value. In the first embodiment, the MTF characteristic is converted so that a predetermined MTF characteristic value is obtained with respect to the number of lines when a pattern of a reference chart shown in FIG. 5 is scanned.

The color converting unit 123 converts a color space of the RGB image data into a predetermined color space. It is preferable to perform color-space conversion so that a color space is to have a size that hardly clips or compresses the input RGB image data. In the first embodiment, the color space is converted so that an ADOBE RGB color space that is one of standardized color spaces is obtained when the chart shown in FIG. 4 is scanned (ADOBE is a trademark of Adobe Systems Inc.). It is assumed that the color conversion is performed by using a known three-dimensional lookup method.

The resolution converting unit 124 converts a size (a resolution) of the RGB image data into a predetermined resolution, and outputs the converted RGB image data to the bus control unit 13. In FIG. 3, the converted RGB image data is described as image data 1. In the first embodiment, it is assumed that the size (the resolution) is to be converted into 600 dot per inch (dpi) although the present invention is not limited to this example. In the first embodiment, the resolution is converted by using a known digital interpolation calculation method using neighboring pixels of a target position.

Upon receiving the RGB image data (the image data 1) from the first image-data processing unit 12, the bus control unit 13 stores the RGB image data in the memory 17 via the CPU 16. The RGB image data stored in the memory 17 can also be stored in the HDD 15 according to need of reoutput or the like.

The RGB image data stored in the memory 17 is output to the second image-data processing unit 14 via the CPU 16 and the bus control unit 13. The second image-data processing unit 14 converts the received RGB image data into a color signal of CMYK (cyan, magenta, yellow, and black) for plotter output (hereinafter, "CMYK image data") and outputs the CMYK image data to the plotter unit 19.

Figure 6:
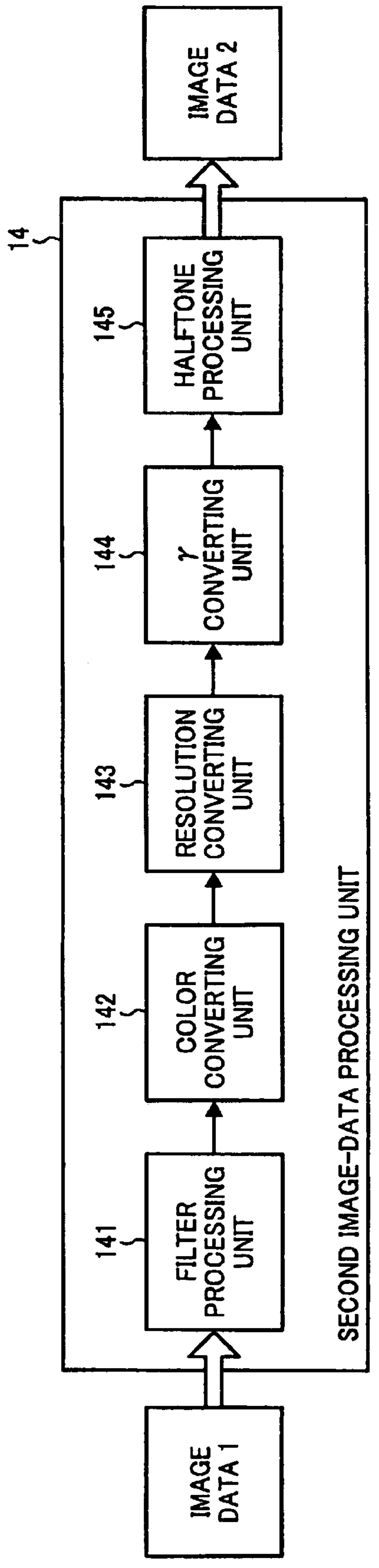
FIG. 6 is a process block diagram of a second image-data processing unit shown in FIG. 1.

FIG. 6 is a process block diagram of the second image-data processing unit 14. The second image-data processing unit 14 includes a filter processing unit 141, a color converting unit 142, a resolution converting unit 143, the γ converting unit 144, and a halftone processing unit 145.

The filter processing unit 141 corrects sharpness and a signal-to-nose ratio (SNR) of the RGB image data (the image data 1) input from the bus control unit 13 so that reproducibility of the RGB image data to be output to the plotter unit 19 is improved. Concretely, the filter processing unit 141 performs a sharpening process or a smoothing process based on information about a desired mode. For example, the filter processing unit 141 performs the sharpening process in the character mode to make character outline sharp and bold. On the other hand, the filter processing unit 141 performs the smoothing process in the photograph mode to make gradation expression smooth. In the first embodiment, it is assumed that conversion is performed by using a known three-dimensional lookup method.

Upon receiving the RGB image data that has been corrected by the filter processing unit 141, the color converting unit 142 converts the 8-bit-based RGB image data into 8-bit-based CMYK image data corresponding to a color space supported by the plotter unit 19. At this time, color saturation is also adjusted based on the information of a desired mode specified by a user. When receiving the color-material saving instruction from the CPU 16, the color converting unit 142 performs a process of increasing brightness (to make it brighter) at the time of color conversion to adjust the total amount of color material to be used.

The resolution converting unit 143 converts a size (a resolution) of the CMYK image data converted by the color converting unit 142 into a size (a resolution) corresponding to reproducibility of the plotter unit 19. In the first embodiment, it is assumed that the plotter unit 19 is capable of 600 dpi output, and therefore, the resolution converting unit 143 does not perform the above-mentioned conversion.

The γ converting unit 144 performs γ conversion corresponding to a gradation process capability of the plotter unit 19 to convert a γ characteristic of the CMYK image data that is converted by the resolution converting unit 143. When receiving the color-material saving instruction from the CPU 16, the γ converting unit 144 performs a process by using a γ curve that is set in advance such that the entire density of the CMYK image data is reduced, based on the save rate set for a paper type and a paper characteristic of a paper to be printed. In this manner, the γ converting unit 144 performs an image process for adjusting a consumption amount of color material (hereinafter, "color-material saving process").

The paper type and the paper characteristic of the paper to be printed can be input by a user via the operation display unit 20. When a specific paper type and a specific paper characteristic are fixedly used, it is applicable to set the paper type and the paper characteristic as setting information in the HDD 15 in advance. It is also applicable to arrange a paper-characteristic measuring unit that can detect the paper type and measure the paper characteristic in a paper feed unit of the plotter unit 19 to acquire the paper type and the paper characteristic of a paper. A configuration including the paper-characteristic measuring unit is described below.

Figure 7:
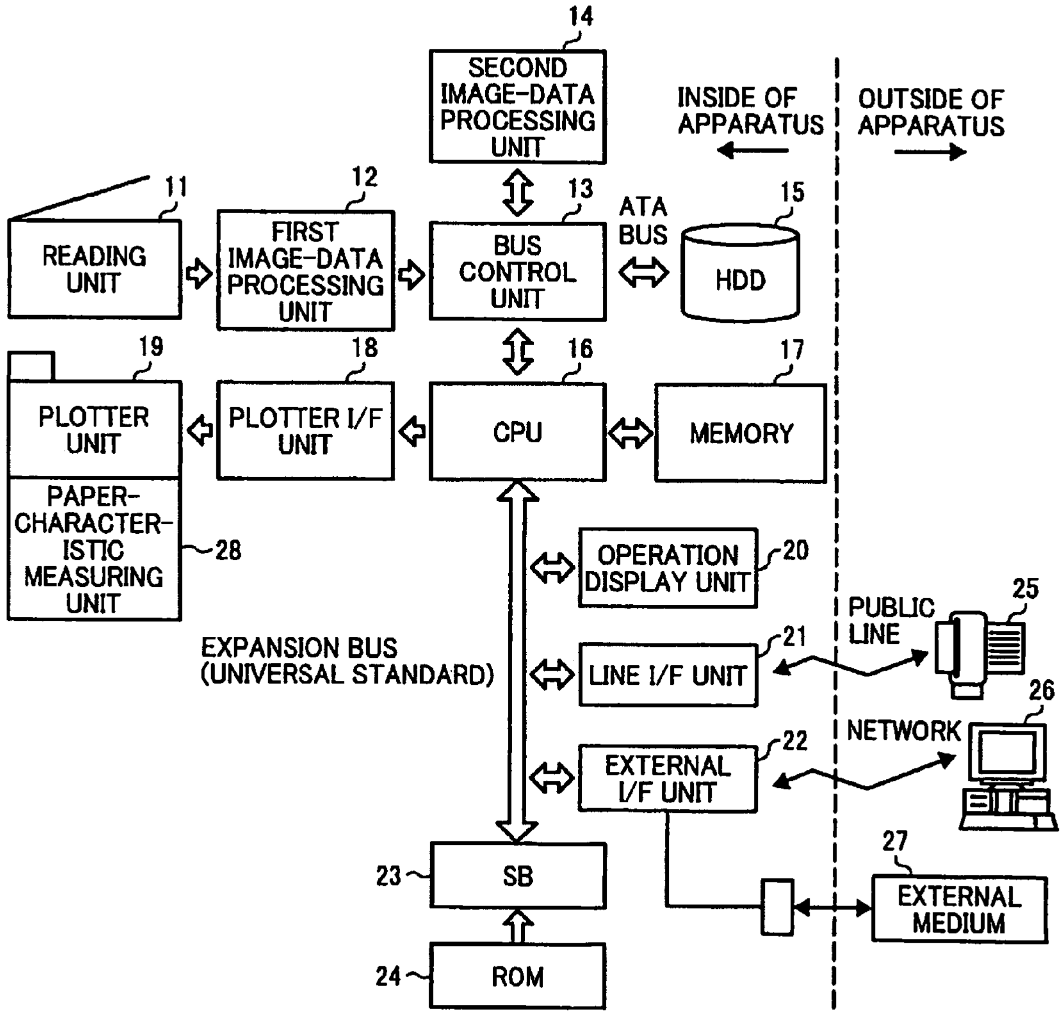
FIG. 7 is a block diagram of another system configuration of the digital color MFP according to the first embodiment.

FIG. 7 is a block diagram of another system configuration of the digital color MFP according to the first embodiment, in which a paper-characteristic measuring unit 28 is included in the plotter unit 19. The paper-characteristic measuring unit 28 is arranged near a paper feed tray (not shown) or a paper conveying path (not shown) of the plotter unit 19, and detects a paper type and a paper characteristic.

The paper-characteristic measuring unit 28 can detect the paper type and the paper characteristic by using the following methods. That is, a method for optically detecting specific reflected light (specularly reflected light and diffusely reflected light) obtained by irradiating a recording paper with light, a method for directly or indirectly detecting surface roughness of a paper, a method for detecting a light transmittance, and a method for reading information from a mark or an integrated circuit (IC) tag embedded in a paper or a paper feed tray are applicable. The paper-characteristic measuring unit 28 includes a function unit (not shown) that implements at least one (or all) of the above-mentioned methods to detect the paper type and the paper characteristic of a paper, and sends the detected paper type and the detected paper characteristic to the second image-data processing unit 14 via the plotter I/F unit 18, the CPU 16, and the bus control unit 13.

It is also applicable to configure the paper-characteristic measuring unit 28 to be an imaging unit so that the imaging unit takes an image of a recording paper and detects the paper type and the paper characteristic of the recording paper based on feature data obtained from the taken image. In this case, the imaging unit can be arranged near the paper feed tray or the paper conveying path. Alternatively, it is possible to use the reading unit 11 that functions as an input unit as the paper-characteristic measuring unit 28 (the imaging unit).

Figure 8:
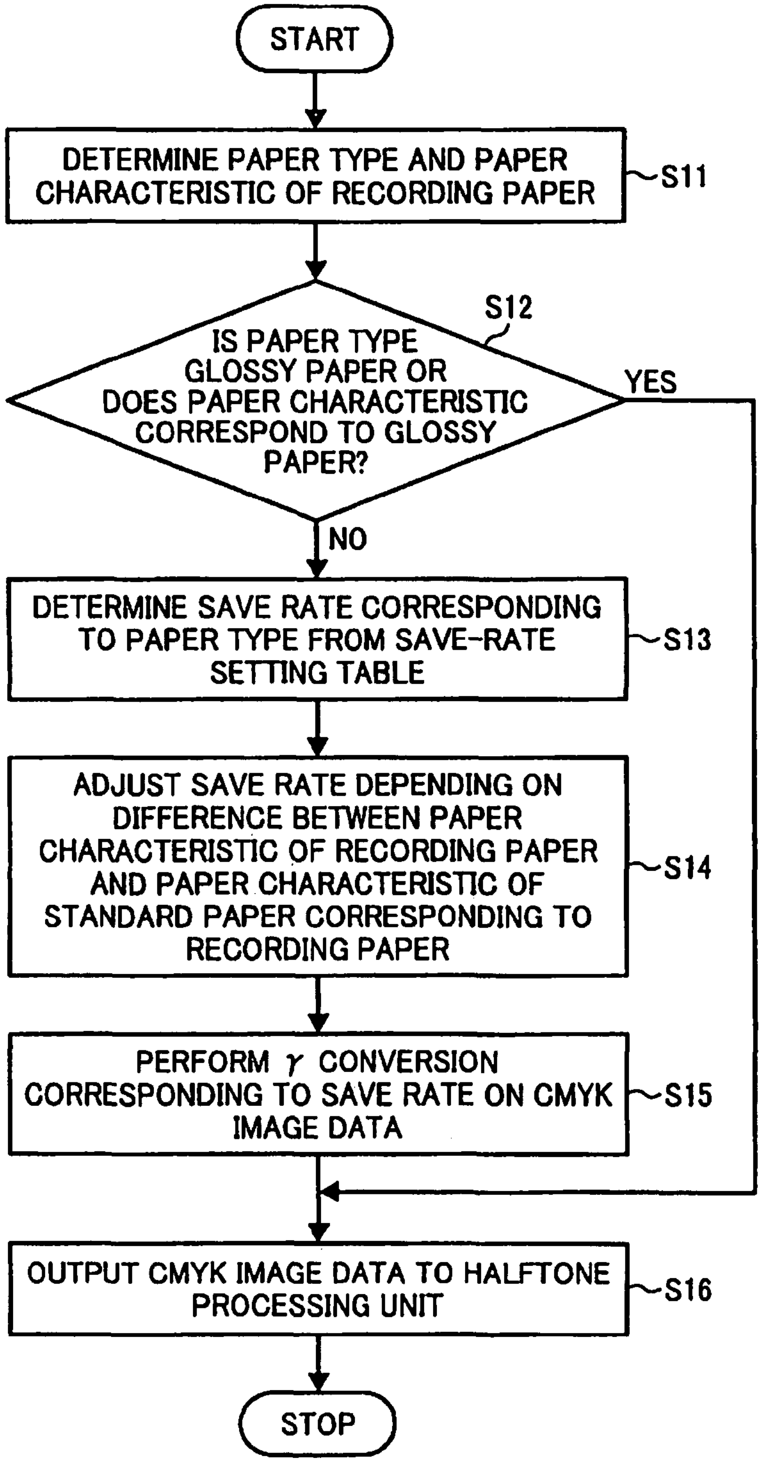
FIG. 8 is a flowchart of a color-material saving process.

An operation of the γ converting unit 144 is described below with reference to FIG. 8. FIG. 8 is a flowchart of the color-material saving process performed by the γ converting unit 144. The γ converting unit 144 determines a paper type and a paper characteristic of a recording paper based on a measurement value input by the paper-characteristic measuring unit 28 (Step S11). Then, the γ converting unit 144 determines whether the determined paper type of the recording paper corresponds to a glossy paper, or whether a gloss level of the paper characteristic of the recording paper corresponds to that of the glossy paper (Step S12). Whether the gloss level of the paper characteristic corresponds to that of a glossy paper is determined by comparison using a predetermined threshold that is determined based on the paper characteristic of the glossy paper (e.g., to determine that there is a correspondence when a difference between the gloss levels of the recording paper and the glossy paper is within 5%).

When a determination result at Step S12 is true (YES at Step S12), the γ converting unit 144 assumes that the recording paper has relatively high paper quality, and outputs the CMYK image data to the halftone processing unit 145 without performing any processes (Step S16). Although the CMYK image data is immediately output to the halftone processing unit 145 without any processes when the paper type corresponds to the glossy paper and the gloss level of the paper characteristic of the recording paper corresponds to that of the glossy paper, it is applicable to set the save rate at Step S16 similar to cases of other paper types and other paper characteristics.

When a determination result at Step S12 is false (NO at Step S12), the γ converting unit 144 acquires a save rate corresponding to the paper type of the recording paper from the save-rate setting table stored in the HDD 15 via the bus control unit 13 (Step S13). Then, the γ converting unit 144 adjusts the acquired save rate based on the paper characteristic of the recording paper, which is input by the paper-characteristic measuring unit 28, and the paper characteristic of the standard paper corresponding to the paper type of the recording paper (Step S14). At this time, the paper characteristics of the same class are compared with each other.

Assuming that the paper characteristic (the gloss level) of the standard paper of a plain paper is set to 50 and the save rate of the same standard paper is set to 40% in the save-rate setting table, and if it is determined at Step S11 that the paper type of the recording paper corresponds to a plain paper and its paper characteristic (the gloss level) is 50, the γ converting unit 144 does not perform the adjustment process at Step S14 and employs the save rate of 40% as set in the save-rate setting table because the paper characteristic of the recording paper is the same as that of the standard paper.

Meanwhile, if the paper characteristic of the recording paper does not correspond to the set paper characteristic of the standard paper, the save rate is adjusted based on a difference between the paper characteristics of the recording paper and the standard paper. Concretely, when the gloss level of the recording paper is higher than that of the standard paper, the γ converting unit 144 increases the save rate depending on a difference between the gloss levels of the recording paper and the standard paper. In other words, when the gloss level of the recording paper is higher than that of the standard paper, more intensive contrast than that of the standard paper is obtained by the recording paper. Therefore, the same amount of information as that to be output on a reference paper can be output by increasing a saving amount of the color material compared with the saving amount employed for the standard paper.

On the other hand, when the gloss level of the recording paper is lower than that of the standard paper, the γ converting unit 144 reduces the save rate depending on a difference between the gloss levels of the recording paper and the standard paper. In other words, when the gloss level of the recording paper is lower than that of the standard paper, less intensive contrast than that of the standard paper is obtained by the recording paper. Therefore, the same amount of information as that to be output on a reference paper can be output by reducing a saving amount of the color material compared with the saving amount employed for the standard paper.

Not only the above-described gloss level but also the followings can be used as the paper characteristic. That is, a whiteness level that largely affects a contrast of a paper, a smoothness that affects fixability of color material such as ink or toner, a transmittance that affects ink strike-through can be used as the paper characteristic, and the like.

When the whiteness level is used as the paper characteristic, the save rate can be adjusted in the same manner as when the gloss level is used. When the smoothness is used as the paper characteristic, the fixability of color material at the time of image formation increases as the smoothness of the paper increases. Therefore, if the smoothness of a paper to be printed is higher than that of the standard paper, the save rate of the color material can be increased. On the other hand, if the smoothness of a paper to be printed is lower than that of the standard paper, the fixability of the color material decreases. Therefore, the same amount of information as that to be output on the reference paper can be output by reducing the save rate of the color material.

When the transmittance is used as the paper characteristic, the ink strike-through is more likely to occur after image formation as the transmittance of a paper increases. Therefore, if the transmittance of a paper to be printed is higher than that of the standard paper, the ink strike-through can be suppressed by increasing the save rate of the color material. On the other hand, if the transmittance of a paper to be printed is lower than that of the standard paper, the amount of information to be output on the paper can be the same as that to be output on the reference paper by reducing the save rate of the color material. Because the ink strike-through becomes problematic mainly when both-side printing is performed, it is applicable to disable the control of the save rate at the time of one-side printing and enable the control only at the time of both-side printing. When the paper type of a paper corresponds to an overhead projector (OHP) sheet, because the paper is optically transparent originally, it is preferable to disable the control of the save rate regardless of the transmittance.

Various paper characteristics other than the above-described examples can also be used, and in any cases, the same principle as described above, in which the save rate of the color material is adjusted depending on a difference between the paper characteristic of a recording paper and the paper characteristic of the standard paper corresponding to the paper type of the recording paper, can be applied. It is also possible to comprehensively adjust the save rate based on a plurality of paper characteristics. In this case, it is preferable to have a configuration that enables a user to set priorities or weighting to the paper characteristics as appropriate. Furthermore, it is preferable to have a configuration in which the paper characteristic to be used as the standard paper is not fixedly determined and it can be changed by a user as appropriate.

The γ converting unit 144 performs γ conversion on the CMYK image data based on the save rate (Step S15), and outputs the CMYK image data to the halftone processing unit 145 (Step S16). It is assumed that the processing content of the γ conversion performed at Step S15 is determined in advance such that the total consumption amount of the color material to be used by the plotter unit 19 for printing can be reduced by the amount corresponding to the save rate.

In this manner, the γ converting unit 144 determines the save rate corresponding to the paper type and the paper characteristic of the recording paper on which an image of the RGB image data is formed, from the save-rate setting table, and then performs the color-material saving process on the RGB image data based on the save rate. Thus, the color-material saving process can be performed on the RGB image data depending on the paper type and the paper characteristic of the recording paper. As a result, the consumption amount of the color material to be used for image formation can be reduced by the amount corresponding to the save rate. Furthermore, by adjusting the save rate depending on a difference between the paper characteristic of the recording paper and the paper characteristic set in the save-rate setting table, the color-material saving process can be performed with a save rate that is more suitable for the paper characteristic of the recording paper used for actual image formation.

Returning to FIG. 6, upon receiving the CMYK image data from the γ converting unit 144, the halftone processing unit 145 performs a halftone process corresponding to the gradation process capability of the plotter unit 19 on the CMYK image data, and then outputs the CMYK image data (image data 2) to the bus control unit 13. In the first embodiment, the halftone process is performed on the 2-bit-based CMYK image data by using an error diffusion method that is one of pseudo halftone processes.

Upon receiving the CMYK image data (the image data 2) from the halftone processing unit 145, the bus control unit 13 stores the CMYK image data in the memory 17 via the CPU 16. The CMYK image data stored in the memory 17 is sent to the plotter unit 19 via the CPU 16 and the plotter I/F unit 18. The plotter unit 19 outputs the received CMYK image data onto a recording paper that is a printing object, whereby a copy of an original is formed.

The FAX transmission process (from a scanner input to a FAX transmission) is described below. When a user makes a setting of a desired mode and an input of a FAX transmission start by using the operation display unit 20 with respect to image data stored in the HDD 15, the operation display unit 20 converts the information input by the user into control command data indicating the FAX transmission start in the digital color MFP and issues the control command data. The issued control command data indicating the FAX transmission start is sent to the CPU 16 via the PCI-Express bus.

The CPU 16 runs a computer program for the FAX-transmission process (FAX application) based on the control command data indicating the FAX transmission start, and sequentially performs settings and operation necessary for FAX-transmission operation. When performing the FAX transmission, the plotter unit 19 is not used. Therefore, the color-material saving instruction is not sent to the second image-data processing unit 14. The FAX-transmission process is described in detail below.

When a user sets an original in the reading unit 11 and makes a setting of a desired mode and an input of a FAX start through the operation display unit 20, the operation display unit 20 converts the information input by the user into control command data indicating the FAX start in the digital color MFP and issues the control command data. The issued control command data indicating the FAX transmission start is sent to the CPU 16 via the PCI-Express bus. The RGB image data read by the reading unit 11 is stored in the memory 17 via the CPU 16.

The CPU 16 determines whether a requested operation is to be performed by using the plotter unit 19 based on the control command data. In a case of the FAX transmission, the plotter unit 19 is not used, and therefore, the color-material saving instruction is not sent to the second image-data processing unit 14.

Then, the RGB image data stored in the memory 17 is output to the line I/F unit 21 via the second image-data processing unit 14, whereby the FAX transmission is performed.

A process performed by the second image-data processing unit 14 for the FAX transmission is described in detail below with reference to FIG. 6. The filter processing unit 141 corrects the sharpness of the RGB image data so that reproducibility of the RGB image data at the time of the FAX transmission is improved. Concretely, the filter processing unit 141 performs a sharpening process or a smoothing process based on information about the desired mode. For example, the filter processing unit 141 performs the sharpening process in the character mode to make character outline sharp and bold. On the other hand, the filter processing unit 141 performs the smoothing process in the photograph mode to make gradation expression smooth.

Upon receiving the 8-bit-based RGB image data, the color converting unit 142 converts the RGB image data into single-color (monochrome) 8-bit-based image data that is typically used in the FAX device 25. The resolution converting unit 143 converts a size (a resolution) of the monochrome image data into a size (a resolution) that is transmittable and receivable by the FAX device 25. In the first embodiment, it is assumed that the resolution converting unit 143 converts the size into 200 dpi (in the main-scanning direction)×100 dpi (in the sub-scanning direction). In the first embodiment, a resolution is converted by using a known digital interpolation calculation method using neighboring pixels of a target position.

The γ converting unit 144 corrects a γ characteristic of the monochrome image data so that the reproducibility at the time of the FAX transmission is improved. For example, the γ conversion is performed by increasing a contrast in the character mode to make character outline sharp and bold. In the photograph mode, the γ conversion is performed with a moderate tone curve to make gradation expression smooth. The γ converting unit 144 does not perform a color-material saving function because this function is not necessary for the FAX transmission that does not include a process of making an output onto a paper, which is different from when a plotter output is performed.

Upon receiving the monochrome image data, the halftone processing unit 145 performs a halftone process corresponding to a halftone process capability for transmission and reception by the FAX device 25. In the first embodiment, binary data is obtained by using an error diffusion method that is one of pseudo halftone processes.

Upon receiving the monochrome binary image data from the halftone processing unit 145, the bus control unit 13 stores the monochrome binary image data in the memory 17 via the CPU 16. The monochrome image data stored in the memory 17 is sent to the line I/F unit 21 via the CPU 16. The line I/F unit 21 transmits the received monochrome image data to the FAX device 25 connected via a communication line.

The scanner-distribution process (from a scanner input to a scanner distribution) is described below. When copying an original, if a user makes a setting of a desired mode and an input of a scanner-distribution start by using the operation display unit 20 with respect to image data stored in the HDD 15, the operation display unit 20 converts the information input by the user into control command data indicating the scanner-distribution start in the digital color MFP and issues the control command data. The issued control command data indicating the scanner-distribution start is sent to the CPU 16 via the PCI-Express bus.

The CPU 16 runs a computer program for the scanner-distribution process (scanner-distribution application) based on the control command data indicating the scanner-distribution start, and sequentially performs settings and operation necessary for scanner-distribution operation. When performing the scanner distribution, the plotter unit 19 is not used.

Therefore, the color-material saving instruction is not sent to the second image-data processing unit 14. The scanner-distribution process is described in detail below.

The reading unit 11 acquires RGB image data by scanning an original and sends the RGB image data to the first image-data processing unit 12. The first image-data processing unit 12 standardizes characteristics of the RGB image data to predetermined characteristics and then sends the standardized RGB image data to the bus control unit 13. The process performed by the first image-data processing unit 12 is the same as that described in the process from the scanner input to the plotter output, and therefore, the same explanation is not repeated.

Upon receiving the RGB image data from the first image-data processing unit 12, the bus control unit 13 sores the RGB image data in the memory 17 via the CPU 16. The RGB image data stored in the memory 17 can also be stored in the HDD 15 according to need of reoutput.

The RGB image data stored in the memory 17 is output to the second image-data processing unit 14 via the CPU 16 and the bus control unit 13. The second image-data processing unit 14 converts the received RGB image data into image data for scanner distribution (RGB multivalued image data, gray-scale image data, or monochrome binary image data), and outputs the converted image data to the bus control unit 13.

A process performed by the second image-data processing unit 14 for the scanner distribution is described in detail below with reference to FIG. 6. The filter processing unit 141 corrects the sharpness of the RGB image data so that reproducibility of the RGB image data at the time of the scanner distribution is improved. Concretely, the filter processing unit 141 performs a sharpening process or a smoothing process based on information about the desired mode. For example, the filter processing unit 141 performs the sharpening process in the character mode to make character outline sharp and bold. On the other hand, the filter processing unit 141 performs the smoothing process in the photograph mode to make gradation expression smooth.

Upon receiving the 8-bit-based RGB image data, the color converting unit 142 converts a color space of the received image data into a specified color space. In the first embodiment, it is assumed that the color space is converted into an 8-based color space that is standardized by standard RGB (sRGB) that is typically used for scanner distribution.

The resolution converting unit 143 converts a size (a resolution) of the sRGB image data into a size (a resolution) to be transmitted and received through the specified scanner distribution. In the first embodiment, it is assumed that the resolution converting unit 143 converts the size into 200 dpi (in the main-scanning direction)×200 dpi (in the sub-scanning direction).

The γ converting unit 144 corrects a γ characteristic of the sRGB image data so that the reproducibility at the time of the scanner distribution is improved. In this case, because the color matching has already been performed by converting the color space into the sRGB color space, the γ conversion is not performed. Furthermore, because the scanner distribution does not include a process of making an output onto a paper, the CPU 16 does not issues the color-material saving instruction and the γ converting unit 144 does not perform the color-material saving process.

The halftone processing unit 145 performs a halftone process corresponding to a halftone process capability for transmission and reception by the specified scanner distribution. In the first embodiment, the gradation process is not performed based on assumption that the 16 million different colors of 8-bit-based RGB are specified.

Upon receiving the image data from the halftone processing unit 145, the bus control unit 13 stores the received image data in the memory 17 via the CPU 16. The image data stored in the memory 17 is sent to the external I/F unit 22 via the CPU 16. The external I/F unit 22 transmits the received image data to the PC 26 connected via the network.

A process from an input of image data by the external I/F unit 22 (an external I/F input) to an output of the image data by the plotter unit 19 (a plotter output) is described below.

When a user mounts an external medium 27 recording image data onto the external I/F unit 22 and makes a setting of a desired mode and an input of a printing start by using the operation display unit 20 with respect to the image data stored in the external medium 27, the operation display unit 20 converts the information input by the user into control command data indicating the printing start in the digital color MFP and issues the control command data. The issued control command data indicating the printing start is sent to the CPU 16 via the PCI-Express bus.

The CPU 16 runs a computer program for a printing operation process (printer application) based on the control command data indicating the printing start, and sequentially performs settings and operation necessary for printing operation. In this case, the CPU 16 determines that the requested operation is to be performed by using the plotter unit 19, and then sends the color-material saving instruction to the second image-data processing unit 14. The printing operation process is described in detail below.

The RGB image data obtained from the external medium 27 via the external I/F unit 22 or the RGB data that has been printed out after a rendering process by the PC 26 is stored in the memory 17 via the CPU 16 such that the standardized color space is maintained. Various definitions can be applied to the standardized color space; however, sRGB and ADOBE RGB are often used in general.

If the input RGB data has a color space that is not expected in advance, the RGB image data stored in the memory 17 is sent to the second image-data processing unit 14 via the CPU 16 and the bus control unit 13. Then, the second image-data processing unit 14 converts the color space of the RGB image data into a predetermined color space and re-stores the RGB image data in the memory 17. The RGB image data stored in the memory 17 can also be stored in the HDD 15 according to need of reoutput.

The RGB image data stored in the memory 17 is output to the second image-data processing unit 14 via the CPU 16 and the bus control unit 13. Upon receiving the RGB image data, the second image-data processing unit 14 converts the received RGB image data into CMYK image data for plotter output, and then outputs the CMYK image data to the bus control unit 13. The process performed by the second image-data processing unit 14 is the same as that described in the process from the scanner input to the plotter output, and therefore, the same explanation is not repeated. The γ converting unit 144 performs the γ conversion process as described above with reference to FIG. 8 depending on the color-material saving instruction sent by the CPU 16.

Upon receiving the CMYK image data from the second image-data processing unit 14 (the halftone processing unit 145), the bus control unit 13 stores the CMYK image data in the memory 17 via the CPU 16. The CMYK image data stored in the memory 17 is then sent to the plotter unit 19 via the CPU 16 and the plotter I/F unit 18. The plotter unit 19 outputs the received CMYK image data onto a recording paper as a printing object, whereby the image data stored in the external medium 27 is printed out.

A process from an input of image data by the external I/F unit 22 (an external I/F input) to a FAX transmission by the FAX device 25 is described below.

When a user mounts the external medium 27 recording image data onto the external I/F unit 22 and makes a setting of a desired mode and an input of a FAX transmission start by using the operation display unit 20 with respect to the image data stored in the external medium 27, the operation display unit 20 converts the information input by the user into control command data indicating the FAX transmission start in the digital color MFP and issues the control command data. The issued control command data indicating the FAX transmission start is sent to the CPU 16 via the PCI-Express bus.

The CPU 16 runs a computer program for the FAX-transmission process (FAX application) based on the control command data indicating the FAX transmission start, and sequentially performs settings and operation necessary for FAX-transmission operation. When performing the FAX transmission, the plotter unit 19 is not used. Therefore, the color-material saving instruction is not sent to the second image-data processing unit 14. The FAX-transmission process is described in detail below.

The RGB image data obtained from the external medium 27 via the external I/F unit 22 or the RGB data that has been printed out through a rendering process by the PC 26 is stored in the memory 17 via the CPU 16.

The RGB image data stored in the memory 17 is represented by using the same color space as that used when the RGB image data is generated. However, if the color space does not correspond to the color space supported by the digital color MFP, the RGB image data stored in the memory 17 is sent to the second image-data processing unit 14 via the CPU 16 and the bus control unit 13. Then, the second image-data processing unit 14 converts the color space of the RGB image data into a predetermined color space and re-stores the RGB image data in the memory 17. The RGB image data stored in the memory 17 can also be stored in the HDD 15 according to need of reoutput.

The RGB image data stored in the memory 17 is output to the second image-data processing unit 14 via the CPU 16 and the bus control unit 13. Upon receiving the RGB image data, the second image-data processing unit 14 converts the received RGB image data into monochrome binary image data for FAX transmission, and then outputs the image data to the bus control unit 13. The process performed by the second image-data processing unit 14 is the same as that described in the process from the scanner input to the FAX transmission, and therefore, the same explanation is not repeated.

Upon receiving the monochrome binary image data from the second image-data processing unit 14 (the halftone processing unit 145), the bus control unit 13 stores the monochrome binary image data in the memory 17 via the CPU 16. The monochrome binary image data stored in the memory 17 is sent to the line I/F unit 21 via the CPU 16. The line I/F unit 21 transmits the received monochrome binary image data to the FAX device 25 connected via a communication line.

A process from an input of image data by the external I/F unit 22 (an external I/F input) to a distribution of the image data by the PC 26 (a scanner distribution) is described below.

When a user mounts the external medium 27 recording image data onto the external I/F unit 22 and makes a setting of a desired mode and an input of a scanner distribution start by using the operation display unit 20 with respect to the image data stored in the external medium 27, the operation display unit 20 converts the information input by the user into control command data indicating the scanner distribution start in the digital color MFP and issues the control command data. The issued control command data indicating the scanner distribution start is sent to the CPU 16 via the PCI-Express bus.

The CPU 16 runs a computer program for the scanner distribution process (scanner application) based on the control command data indicating the scanner distribution start, and sequentially performs settings and operation necessary for scanner distribution operation. The scanner distribution process is described in detail below.

The RGB image data obtained from the external medium 27 via the external I/F unit 22 or the RGB data that has been printed out through a rendering process by the PC 26 is stored in the memory 17 via the CPU 16 such that the color space that is used when the RGB image data is generated is maintained.

The RGB image data stored in the memory 17 is represented by using the same color space as that used when the RGB image data is generated. However, if the color space does not correspond to the color space supported by the digital color MFP, the RGB image data stored in the memory 17 is sent to the second image-data processing unit 14 via the CPU 16 and the bus control unit 13. Then, the second image-data processing unit 14 converts the color space of the RGB image data into a predetermined color space and re-stores the RGB image data in the memory 17. The RGB image data stored in the memory 17 can also be stored in the HDD 15 according to need of reoutput.

The RGB image data stored in the memory 17 is output to the second image-data processing unit 14 via the CPU 16 and the bus control unit 13. The second image-data processing unit 14 converts the received RGB image data into image data for scanner distribution (RGB multivalued image data, grayscale image data, or monochrome binary image data), and outputs the converted image data to the bus control unit 13. The process performed by the second image-data processing unit 14 is the same as that described in the process from the scanner input to the scanner distribution, and therefore, the same explanation is not repeated.

Upon receiving the image data from the halftone processing unit 145, the bus control unit 13 stores the received image data in the memory 17 via the CPU 16. The image data stored in the memory 17 is sent to the external I/F unit 22 via the CPU 16. The external I/F unit 22 transmits the received image data to the PC 26 connected via the network.

In this manner, according to the first embodiment, a paper type of a recording paper is determined and a paper characteristic of the recording paper is detected. Then, RGB image data is formed on the recording paper by performing the color-saving process for adjusting the consumption amount of color material to be used for forming an image of the RGB image data onto the recording paper based on the paper type and the paper characteristic such that the substantially same output as that obtained on a reference paper can be obtained. Therefore, when forming an image of the RGB image data onto the recording paper, image processing corresponding to the paper type and the paper characteristic of the recording paper can be performed. As a result, the substantially same output as obtained with the reference paper can be obtained when an image of the RGB image data is formed on the recording paper. It is also possible to suppress the consumption amount of color material used for the image formation.

Furthermore, the save rate corresponding to the paper type and the paper characteristic of the recording paper is determined from the save-rate setting table, and then the color-material saving process is performed on the RGB image data based on the save rate. Thus, the color-material saving process can be performed on the RGB image data depending on the paper type and the paper characteristic of the recording paper. As a result, the consumption amount of the color material to be used for image formation can be reduced by the amount corresponding to the save rate.

In the first embodiment, the example is described in which the processes are performed by using image data input from the input unit through the scanner input or the external I/F input. However, the processes can be performed by using image data stored in the HDD 15.

While it is assumed in the first embodiment that the γ converting unit 144 included in the second image-data processing unit 14 performs the color-material saving process, a second embodiment of the present invention is described below in which a function unit for performing the color-saving process is independently arranged.

Figure 9:
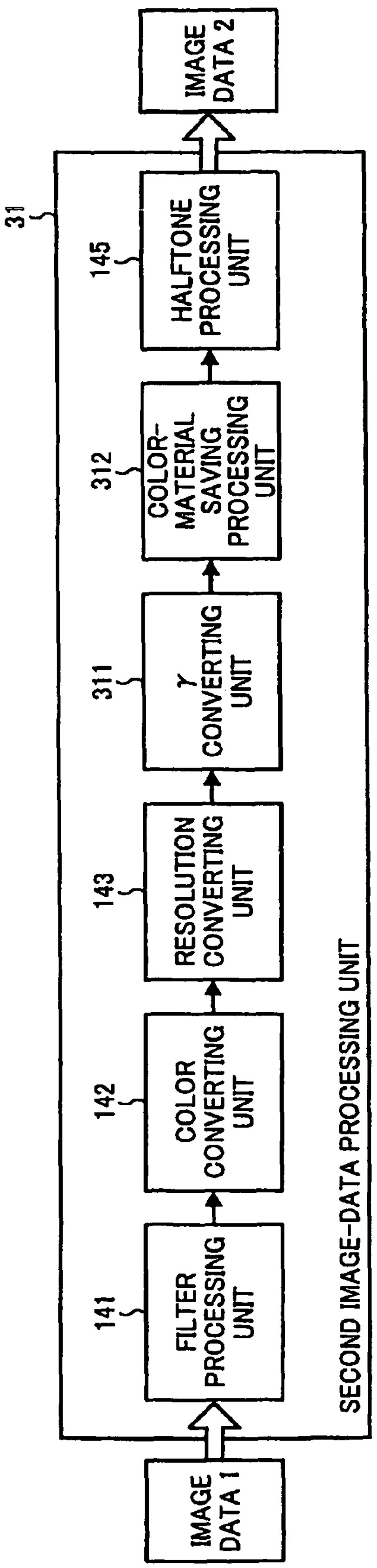
FIG. 9 is a process block diagram of a second image-data processing unit according to a second embodiment of the present invention.

FIG. 9 is a process block diagram of a second image-data processing unit 31 according to the second embodiment. The second image-data processing unit 31 includes the filter processing unit 141, the color converting unit 142, the resolution converting unit 143, a γ converting unit 311, a color-material saving processing unit 312, and the halftone processing unit 145. The color-material saving processing unit 312 is a function unit that performs the color-material saving function (the color-material saving process), which is performed by the γ converting unit 144 in the first embodiment. The γ converting unit 311 includes the same functions as those of the γ converting unit 144 except for the color-material saving function.

Figure 10:
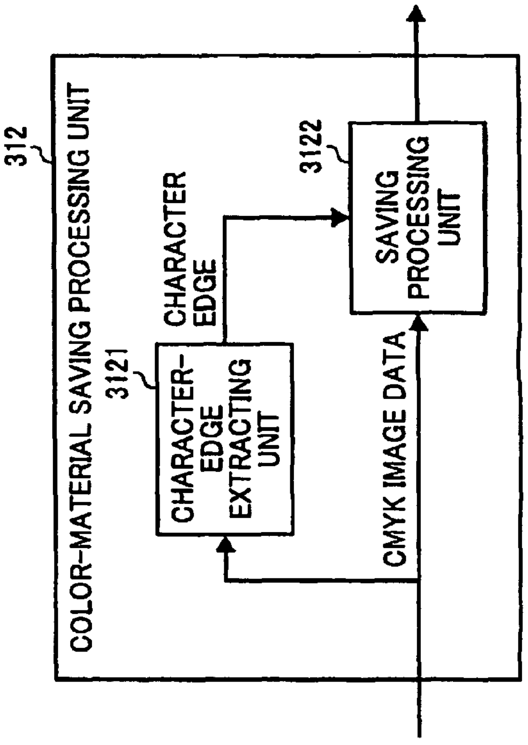
FIG. 10 is a block diagram of a detailed configuration of a color-material saving processing unit shown in FIG. 9.

FIG. 10 is a block diagram of a detailed configuration of the color-material saving processing unit 312. The color-material saving processing unit 312 includes a character-edge extracting unit 3121 and a saving processing unit 3122. The character-edge extracting unit 3121 extracts a character edge in units of pixel with respect to CMYK image data input by the γ converting unit 311. The character edge can be extracted by using a known technique, e.g., a technique disclosed in Japanese Patent Application Laid-open No. 2002-086805.

The saving processing unit 3122 segments the CMYK image data into a character area and a picture area based on the character edge extracted by the character-edge extracting unit 3121. The saving processing unit 3122 determines a save rate with respect to the paper type and the paper characteristic of a paper to be a printing object based on the save-rate setting table stored in the HDD 15, and then separately adjusts the save rate for each of the character area and the picture area. The saving processing unit 3122 separately changes a γ characteristic (brightness) of the CMYK image data for each of the character area and the picture area so that image formation is performed by using the adjusted save rate, and then outputs the CMYK image data to the bus control unit 13.

Because the amount of information in the character area is generally larger than that in the picture area, it is preferable to adjust the save rates so that the save rate of the picture area is higher than the save rate of the character area. However, because how the information is segmented may depend on a use environment, it is also applicable to adjust the save rates so that the save rate of the picture area is lower than the save rate of the character area.

In the second embodiment, it is assumed that the saving processing unit 3122 acquires the save rate from the save-rate setting table and separately adjusts the save rate for each of the character area and the picture area. However, it is applicable to set the save rates of the character area and the picture area in the save-rate setting table in advance. Furthermore, while it is explained that the save rate is determined based on the save-rate setting table, it is possible to determine the save rate by using a predetermined relational expression among the paper type, the paper characteristic, and the save rate set in the save-rate setting table.

Returning to FIG. 9, upon receiving the CMYK image data from the color-material saving processing unit 312, the halftone processing unit 145 performs a halftone process corresponding to the gradation process capability of the plotter unit 19 on the CMYK image data, and then outputs the CMYK image data (the image data 2) to the bus control unit 13. In the second embodiment, the halftone process is performed on 2-bit-based CMYK image data by using an error diffusion method that is one of pseudo half tone processes.

Upon receiving the CMYK image data from the halftone processing unit 145, the bus control unit 13 stores the CMYK image data in the memory 17 via the CPU 16. The CMYK image data stored in the memory 17 is sent to the plotter unit 19 via the CPU 16 and the plotter I/F unit 18. The plotter unit 19 outputs the received CMYK image data onto a recording paper that is a printing object, whereby a copy of an original is formed.

In this manner, according to the second embodiment, the color-material saving process is performed separately with respect to the character area and the picture area contained in the image data, based on the respective characteristics of the character area and the picture area. Therefore, image processing corresponding to the characteristics of the character area and the picture area contained in the image data can be performed separately. As a result, the substantially same output as obtained on the reference paper can be obtained with respect to each of the character area and the picture area and the consumption amount of the color material used for the image formation can be suppressed.

While, in the second embodiment, examples in which the color-material saving processing unit 312 segments the CMYK image data into the character area and the picture area is described, a third embodiment of the present invention is described below using an example in which segmentation into the character area and the picture area is performed with respect to RGB image data.

Figure 11:
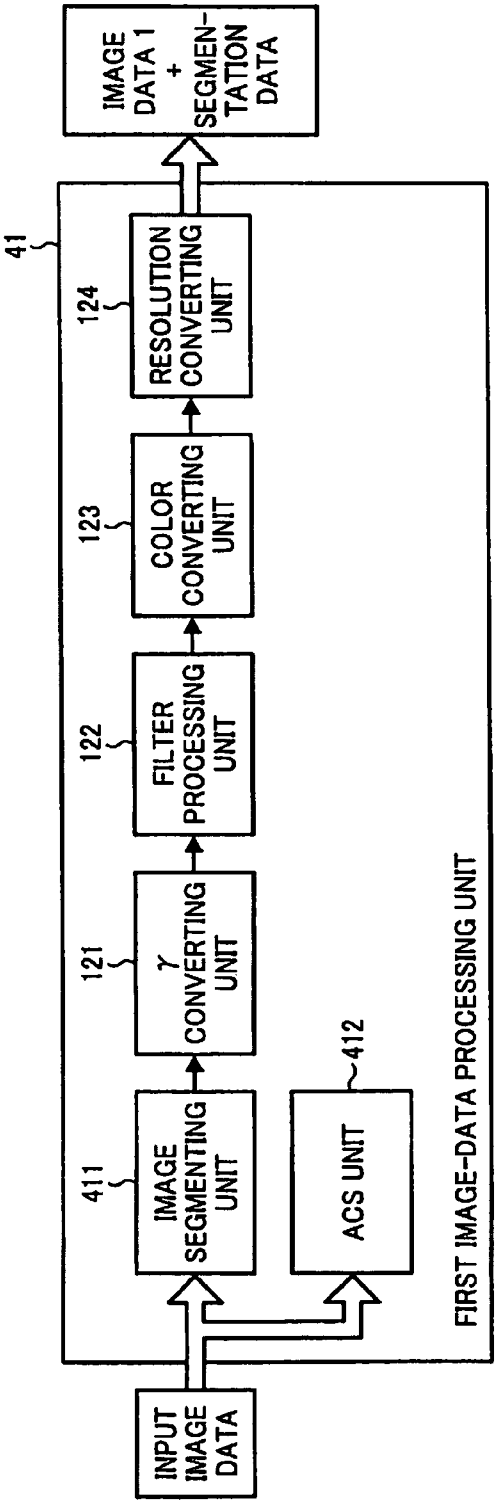
FIG. 11 is a process block diagram of a first image-data processing unit according to a third embodiment of the present invention.

FIG. 11 is a process block diagram of a first image-data processing unit 41 according to the third embodiment. The first image-data processing unit 41 includes an image segmenting unit 411, an auto color select (ACS) unit 412, the γ converting unit 121, the filter processing unit 122, the color converting unit 123, and the resolution converting unit 124.

The image segmenting unit 411 segments the RGB image data (input image data) received from the reading unit 11 into a character area and a picture area based on a reflectivity of the RGB image data, and then generates segmentation data indicating areas of the character area and the picture area. The generated segmentation data is attached to the RGB image data and sent to a process block in a subsequent stage.

At the same time of the operation by the image segmenting unit 411, the ACS unit 412 determines whether an input original of the RGB data received by the reading unit 11 is a color original or a monochrome original. This determination result is output to the CPU 16 via the bus control unit 13, and the CPU 16 stores the RGB data with the segmentation data in the HDD 15. The segmentation by the image segmenting unit 411 and the auto color select by the ACS unit 412 can be performed by using a known technique. For example, a technique disclosed in Japanese Patent Application Laid-open No. 2003-044772 can be used.

The γ converting unit 121 converts a γ characteristic of the RGB image data received from the image segmenting unit 411 into a predetermined value (e.g., γ=2.2) that is determined from a characteristic based on reflectivity through γ conversion. In the third embodiment, the γ characteristic is converted so that a predetermined γ characteristic is obtained when a chart shown in FIG. 4 is scanned.

The filter processing unit 122 converts an MTF characteristic indicating sharpness of the RGB image data into a predetermined characteristic value. In the third embodiment, the MTF characteristic is converted so that a predetermined MTF characteristic value is obtained with respect to the number of lines when a pattern of a reference chart shown in FIG. 5 is scanned.

The color converting unit 123 converts a color space of the RGB image data into a predetermined color space. It is preferable to perform color-space conversion so that a color space is to have a size that hardly clips or compresses the colors of the input RGB image data. In the third embodiment, the color space is converted so that a standardized color space (e.g., an ADOBE RGB color space) is obtained when the chart shown in FIG. 4 is scanned. It is assumed that color conversion is performed by using a known three-dimensional lookup method.

The resolution converting unit 124 converts a size (a resolution) of the RGB image data into a predetermined resolution. In the third embodiment, it is assumed that the size (the resolution) is to be converted into 600 dpi. However, the present invention is not limited to this example. In the third embodiment, a resolution is converted by using a known digital interpolation calculation method using neighboring pixels of a target position.

The RGB image data (the image data 1) whose characteristic is standardized by the first image-data processing unit 41 and the segmentation data attached to the RGB image data are sent to the bus control unit 13. While it is assumed that no process is performed with respect to the segmentation data, it is applicable to perform appropriate image processing by referring to the segmentation data.

Figure 12:
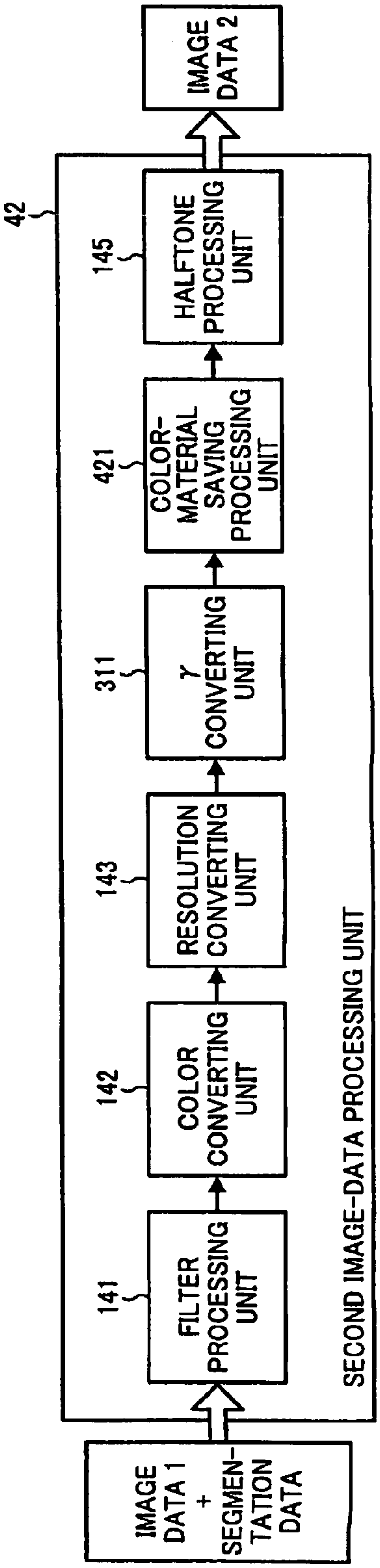
FIG. 12 is a process block diagram of a second image-data processing unit according to the third embodiment.

FIG. 12 is a process block diagram of a second image-data processing unit 42 according to the third embodiment. The second image-data processing unit 42 converts the RGB image data (the image data 1) with the segmentation data received from the first image-data processing unit 41 into CMYK image data for plotter output, and then outputs the CMYK image data.

As shown in FIG. 12, the second image-data processing unit 42 includes the filter processing unit 141, the color converting unit 142, the resolution converting unit 143, the γ converting unit 311, a color-material saving processing unit 421, and the halftone processing unit 145.

The filter processing unit 141 corrects sharpness and an S/N of the RGB image data so that reproducibility of the RGB image data to be output to the plotter unit 19 is improved. Concretely, the filter processing unit 141 performs a sharpening process or a smoothing process based on information about a desired mode. For example, the filter processing unit 141 performs the sharpening process in the character mode to make character outline sharp and bold. On the other hand, the filter processing unit 141 performs the smoothing process in the photograph mode to make gradation expression smooth.

Upon receiving the RGB image data, the color converting unit 142 converts the RGB image data into CMYK image data corresponding to a color space supported by the plotter unit 19. At this time, color saturation is also adjusted based on the information of a desired mode specified by a user. When receiving the color-material saving instruction from the CPU 16, the color converting unit 142 performs a process of increasing brightness (to make it brighter) at the time of color conversion to adjust the total amount of color material to be used.

The resolution converting unit 143 converts a size (a resolution) of the CMYK image data into a size (a resolution) corresponding to reproducibility of the plotter unit 19. In the third embodiment, it is assumed that the plotter unit 19 is capable of 600 dpi output, and therefore, the resolution converting unit 143 does not perform the above-mentioned conversion. The γ converting unit 311 converts a γ characteristic of the CMYK image data through γ conversion according to a gradation process capability of the plotter unit 19.

Upon receiving the color-material saving instruction from the CPU 16, the color-material saving processing unit 421 performs the color-material saving process on the CMYK image data input by the resolution converting unit 143 based on the segmentation data received from the first image-data processing unit 41.

Figure 13:
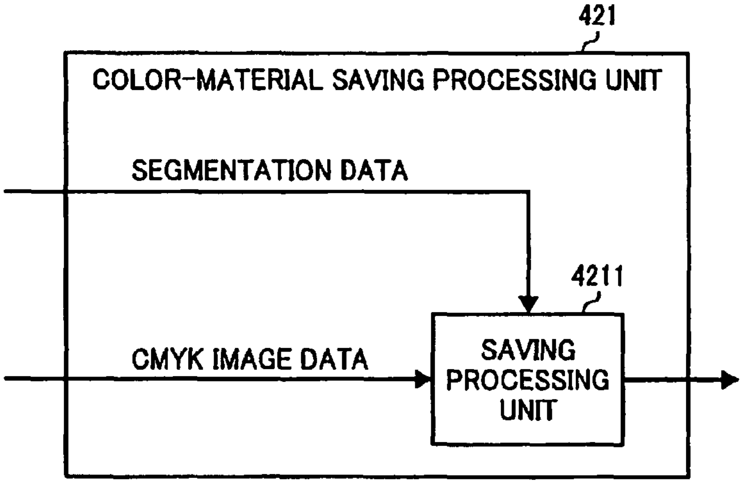
FIG. 13 is a block diagram of a detailed configuration of a color-material saving processing unit shown in FIG. 12.

FIG. 13 is a block diagram of a detailed configuration of the color-material saving processing unit 421. The color-material saving processing unit 421 includes a saving processing unit 4211. Upon receiving the color-material saving instruction from the CPU 16, the saving processing unit 4211 determines the save rate corresponding to the paper type and the paper characteristic of a recording paper from the save-rate setting table stored in the HDD 15, and separately adjusts the save rate for each of the character area and the picture area based on the segmentation data received from the first image-data processing unit 41. The saving processing unit 4211 separately changes the densities of the character area and the picture area of the CMYK image data based on the segmentation data received from the first image-data processing unit 41 so that the image formation is performed with the adjusted save rates, and then outputs the CMYK image data to the bus control unit 13.

It is applicable to change the save rates depending on the determination result obtained by the ACS unit 412 (whether the original is a color original or a monochrome original). Specifically, when the determination result obtained by the ACS unit 412 indicates a monochrome original, it can often be assumed that the input original is a document other than a photograph. Therefore, it is preferable to set a relatively high save rate when the original is a monochrome original, and set the save rate lower than that of the monochrome original when the original is a color original. It is also applicable to set the save rate for each paper type in combination with the save rates of the character area and the picture area. Furthermore, it is applicable to separately set the save rate depending on a color output and a monochrome output.

Returning to FIG. 12, upon receiving the CMYK image data from the color-material saving processing unit 421, the halftone processing unit 145 performs a halftone process corresponding to the gradation process capability of the plotter unit 19 on the CMYK image data, and then outputs the CMYK image data (the image data 2) to the bus control unit 13. In the third embodiment, the halftone process is performed on 2-bit-based CMYK image data by using an error diffusion method that is one of pseudo halftone processes.

Upon receiving the CMYK image data from the halftone processing unit 145, the bus control unit 13 stores the CMYK image data in the memory 17 via the CPU 16. The CMYK image data stored in the memory 17 is sent to the plotter unit 19 via the CPU 16 and the plotter I/F unit 18. The plotter unit 19 outputs the received CMYK image data onto a recording paper that is a printing object, whereby a copy of an original is formed.

In this manner, according to the third embodiment, the color-material saving process is performed separately with respect to the character area and the picture area contained in the image data, based on the respective characteristics of the character area and the picture area. Therefore, image processing corresponding to the characteristics of the character area and the picture area contained in the image data can be performed separately. As a result, the substantially same output as obtained on the reference paper can be obtained with respect to each of the character area and the picture area, and the consumption amount of the color material used for the image formation can be suppressed. Furthermore, the color-material saving process can be performed on image data depending on a color of an original. Therefore, the substantially same output can be obtained with less amount of the color material and with good precision.

In the third embodiment, the example is described in which the input image data is read by the reading unit 11 and is output by the plotter unit 19. However, if an output request for the RGB image data is input by the PC 26 via the external I/F unit 22, it is applicable to use object information instead of the above-described segmentation data. The object information is generally contains a character, a graphic, an image, or a thin line. In this case, it is preferable to classify the character and the thin line into the character area, and classify the graphic and the image into the picture area. When an output by the plotter unit 19 is instructed, output color information indicating either a color output or a monochrome output is to be obtained is input by the PC 26.

In the above-mentioned situation, the same color-material saving process can be performed by storing the object information corresponding to the RGB image data to be input by the PC 26 and the output color information indicating either a color output or a monochrome output in the HDD 15 in an associated manner. At this time, the output color information indicating a color output or a monochrome output can be used as the determination result by the ACS unit 412. As described above, the color-material saving process can be performed on image data depending on an output color specified by the output color information. Thus, the color-material saving process suitable for the output color can be performed on the image data.

When receiving image data via the external I/F unit 22, if another image processing apparatus (an image forming apparatus) having the similar configuration as described above is connected, it is applicable to receive segmentation data and ACS determination result from that image processing apparatus and use the received information. Furthermore, when receiving, via the external I/F unit 22, image data that does not contain the object information or the output color information for identifying a color output or a monochrome output, such as one that is captured by a digital camera, it is applicable to set a fixed value for all sections of the image data such that the entire section is treated as the picture area of color data. In this case, it is preferable to make a configuration so that a user can set the above-mentioned settings as appropriate. It is also applicable to have a configuration in which the CPU 16 performs, after image data is stored in the HDD 15, the segmentation process and the ACS determination process through software on the image data to generate the segmentation data and the ACS determination result.

The present invention is not limited to the specific details and representative examples described in the above embodiments. Accordingly, various modifications can be made without departing from the scope of the present invention. Furthermore, various inventions can be made by combining the constituent elements described in the above embodiments. Moreover, part of the constituent elements can be removed from whole of the constituent elements described in the embodiments or the constituent elements described in different embodiments can be integrated with each other as appropriate.

The computer programs executed in various processes by the digital color MFP can be stored in a computer connected to the digital color MFP via a network such as the Internet in a downloadable manner via the network. Furthermore, the computer programs to be executed in various processes by the digital color MFP can be distributed via the network such as the Internet.

The computer programs to be executed in various processes by the digital color MFP can be pre-stored in a recording medium such as a ROM so that they can be read out from the recording medium.

In the above embodiments, the recording paper is used as an example; however, various other types of printing medium can also be used instead.

According to one aspect of the present invention, the substantially same output as obtained on a reference paper can be obtained when an image of the image data is formed on the recording paper. Moreover, it is also possible to suppress the consumption amount of the color material used for the image formation.

Furthermore, according to another aspect of the present invention, the consumption amount of the color material used for image formation can be suppressed by the amount corresponding to the save rate.

Moreover, according to still another aspect of the present invention, it is prevented that more amount of the color material than that sufficient for image formation is consumed.

Furthermore, according to still another aspect of the present invention, the substantially same output as obtained on the reference paper can be obtained with respect to each of the character area and the picture area.

Moreover, according to still another aspect of the present invention, the substantially same output can be obtained with less amount of color material with high accuracy.

Furthermore, according to still another aspect of the present invention, the consumption amount of the color material used for forming an image of the image data can be adjusted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a sheet-type determining unit configured to determine a sheet type of a recording sheet;

a sheet-characteristic measuring unit configured to measure a sheet characteristic of the recording sheet;

a storing unit configured to store therein setting information including a save rate which is associated with one or more sheet characteristics for each sheet type, the save rate indicating a ratio of a reduction amount of color material for an image on the recording sheet to a consumption amount of the color material for an image on a reference sheet and the save rate being a value determined based on an amount of information relating to an appearance obtained from an output result on the recording sheet and the reference sheet;

an image processing unit configured to determine the save rate corresponding to the sheet type and the sheet characteristic of the recording sheet from the setting information, and perform the image processing on image data of an image to be formed on the recording sheet on the basis of the determined save rate;

an adjusting unit configured to adjust the save rate based on a difference between the measured sheet characteristic of the recording sheet and the sheet characteristic of the reference sheet; and an image forming unit configured to form the image of the image data processed by the image processing unit on the recording sheet.

2. The image forming apparatus according to claim 1, further comprising a segmenting unit that segments the image data into a plurality of areas including a character area and a picture area, wherein the image processing unit is configured to separately perform the image processing on the character area and on the picture area based on characteristics of the character area and the picture area.

3. The image forming apparatus according to claim 1, further comprising:

a reading unit configured to read an image of an original to generate image data of the image; and a color determining unit configured to determine whether the original is color or monochrome, wherein the image processing unit is configured to perform the image processing on the image data obtained by the reading unit based on a result of determination by the color determining unit.

4. The image forming apparatus according to claim 1, further comprising:

an interface unit configured to receive the image data and output-color information indicating an output color of the image data from an external device, wherein the image processing unit is configured to perform the image processing on the image data received by the interface unit based on the output color.

5. The image forming apparatus according to claim 1, wherein the image processing unit is configured to change a gamma characteristic of the image data.

6. An image forming method comprising:

determining a sheet type of a recording sheet;

measuring a sheet characteristic of the recording sheet;

storing setting information including a save rate which is associated with one or more sheet characteristics for each sheet type, the save rate indicating a ratio of a reduction amount of color material for an image on the recording sheet to a consumption amount of the color material for an image on a reference sheet and the save rate being a value determined based on an amount of information relating to an appearance obtained from an output result on the recording sheet and the reference sheet;

determining the save rate corresponding to the sheet type and the sheet characteristic of the recording sheet from the setting information;

adjusting the save rate based on a difference between the measured sheet characteristic of the recording sheet and the sheet characteristic of the reference sheet:

performing an image processing on image data of an image to be formed on the recording sheet on the basis of the determined save rate; and forming the image of the image data processed at the performing on the recording sheet.

7. The image forming method according to claim 6, further comprising:

segmenting the image data into a plurality of areas including a character area and a picture area, wherein the performing includes separately performing the image processing on the character area and on the picture area based on characteristics of the character area and the picture area.

8. The image forming method according to claim 6, further comprising:

reading an image of an original to generate image data of the image; and determining whether the original is color or monochrome, wherein the performing includes performing the image processing on the image data obtained at the reading based on a result of determination at the determining.

9. The image forming method according to claim 6, further comprising:

receiving the image data and output-color information indicating an output color of the image data from an external device, wherein the performing includes performing the image processing on the image data received at the receiving based on the output color.

10. The image forming method according to claim 6, wherein the performing includes changing a gamma characteristic of the image data.

11. A computer program product comprising a non-transitory computer-readable medium having computer-readable program codes embodied in the medium that when executed cause a computer to execute:

determining a sheet type of a recording sheet;

measuring a sheet characteristic of the recording sheet;

storing setting information including a save rate which is associated with one or more sheet characteristics for each sheet type, the save rate indicating a ratio of a reduction amount of color material for an image on the recording sheet to a consumption amount of the color material for an image on a reference sheet and the save rate being a value determined based on an amount of information relating to an appearance obtained from an output result on the recording sheet and the reference sheet;

determining the save rate corresponding to the sheet type and the sheet characteristic of the recording sheet from the setting information;

adjusting the save rate based on a difference between the measured sheet characteristic of the recording sheet and the sheet characteristic of the reference sheet:

performing an image processing on image data of an image to be formed on the recording sheet on the basis of the determined save rate; and forming the image of the image data processed at the performing on the recording sheet.

* * * * *